(12) United States Patent
Ganguli et al.

(10) Patent No.: US 9,428,279 B2
(45) Date of Patent: Aug. 30, 2016

(54) SYSTEMS AND METHODS FOR AIRSPEED ESTIMATION USING ACTUATION SIGNALS

(71) Applicant: Honeywell International Inc., Morristown, NJ (US)

(72) Inventors: Subhabrata Ganguli, Plymouth, MN (US); Dale Frederick Enns, Roseville, MN (US); Xiahong Linda Li, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 114 days.

(21) Appl. No.: 14/339,206

(22) Filed: Jul. 23, 2014

(65) Prior Publication Data

US 2016/0023776 A1    Jan. 28, 2016

(51) Int. Cl.
*B64D 43/02*    (2006.01)
*B64C 13/40*    (2006.01)
*B64C 13/50*    (2006.01)
*G01P 5/02*    (2006.01)
*G01P 5/00*    (2006.01)
*G01P 21/02*    (2006.01)

(52) U.S. Cl.
CPC .............. *B64D 43/02* (2013.01); *B64C 13/40* (2013.01); *B64C 13/50* (2013.01); *G01P 5/00* (2013.01); *G01P 5/02* (2013.01); *G01P 21/025* (2013.01)

(58) Field of Classification Search
CPC ........ B64C 13/40; B64C 13/50; B64D 43/02
See application file for complete search history.

(56) References Cited

U.S. PATENT DOCUMENTS

| 5,063,777 | A | * | 11/1991 | Arethens | ................. G01P 5/00 701/14 |
| 2011/0202291 | A1 | | 8/2011 | Hickman | |
| 2013/0066488 | A1 | * | 3/2013 | Walter | ................. B64D 43/02 701/14 |
| 2013/0325218 | A1 | | 12/2013 | Spoldi | |

FOREIGN PATENT DOCUMENTS

EP    2390670    11/2011

OTHER PUBLICATIONS

GanGuli, "Airspeed Estimation Using Servo Current and Aircraft Model", 2013 pp. 1 publisher IEEE.*

(Continued)

*Primary Examiner* — Justin Benedik
(74) *Attorney, Agent, or Firm* — Fogg & Powers LLC

(57) ABSTRACT

Systems and methods for airspeed estimation using actuation signals are provided. In one embodiment, an on-board avionics airspeed estimation system is provided. The system comprises: a flight control surface for an aircraft; a control surface actuator coupled to the flight control surface, wherein the control surface actuator receives an actuator control output signal from an actuator control system and drives the flight control surface into a position based on the actuator control output signal; a wind estimator coupled to a plurality of aircraft sensors, wherein the plurality of aircraft sensors output a set of aircraft measurements to the wind estimator and wherein the actuator control output signal is further provided to the wind estimator; wherein the wind estimator calculates a wind speed estimate by applying the actuator control output and the set of aircraft measurements to an onboard aircraft model.

20 Claims, 5 Drawing Sheets

(56) References Cited

OTHER PUBLICATIONS

European Patent Office, "Extended European Search Report from EP Application No. 15176557.5 mailed Oct. 21, 2015", "from Foreign Counterpart of U.S. Appl. No. 14/339,206", Oct. 21, 2015, pp. 1-7, Published in: EP.

Ganguli, "Airspeed Estimation Using Servo Current and Aircraft Model", 2013, pp. 1 Publisher: IEEE.
Ganguli, "Airspeed Estimation Using Servo Current and Aircraft Model", "AIAA 32nd Digital Avionics Systems Conference", Oct. 5, 2013, pp. 1-11.

\* cited by examiner

SYSTEMS AND METHODS FOR AIRSPEED ESTIMATION USING ACTUATION SIGNALS

BACKGROUND

Accurate knowledge of airspeed is critical for proper operation of aircraft flight control systems. The primary instrumentation on aircraft today for determining airspeed is the pitot tube. Pitot tubes are used to estimate airspeed by calculating the difference between the dynamic pressure measured by the pitot tube and the static port pressure. However, the airspeed estimate can become erroneous if there is a pitot tube fault. One example of a pitot tube fault is a pitot heater malfunction resulting in built up of ice and affecting the dynamic pressure measurement.

For the reasons stated above and for other reasons stated below which will become apparent to those skilled in the art upon reading and understanding the specification, there is a need in the art for alternate systems and methods for providing airspeed estimates.

SUMMARY

The Embodiments of the present invention provide methods and systems for providing airspeed estimates and will be understood by reading and studying the following specification.

Systems and methods for airspeed estimation using actuation signals are provided. In one embodiment, an on-board avionics airspeed estimation system is provided. The system comprises: a flight control surface for an aircraft; a control surface actuator coupled to the flight control surface, wherein the control surface actuator receives an actuator control output signal from an actuator control system and drives the flight control surface into a position based on the actuator control output signal; a wind estimator coupled to a plurality of aircraft sensors, wherein the plurality of aircraft sensors output a set of aircraft measurements to the wind estimator and wherein the actuator control output signal is further provided to the wind estimator; wherein the wind estimator calculates a wind speed estimate by applying the actuator control output and the set of aircraft measurements to an onboard aircraft model.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide system and methods for generating aircraft airspeed measurements when the aircraft's pitot tube is not working. More specifically, embodiments of the present disclosure obtain wind speed estimates by measuring actuation signals used for operating aircraft control surfaces. Wind interacting with an aircraft in flight produces a load on the aircraft's control surfaces that will vary as a function of wind speed. The amount of wind loading experienced at a control surface affects the amount of actuation energy needed to counter the wind loading and position that control surface into a desired configuration. Consequently, the magnitude of the actuation signal needed to operate the control surface mechanics (whether that signal is in the form of hydraulic pressure or electric current to a servo) can be more or less depending on the wind's speed. As explained in the disclosure below, measurements of this actuation signal, along with other aircraft input output parameters, may be fed into an on-board aircraft model to back-calculate an estimate of wind speed. Once a wind speed estimate value is obtained, it can be vectorially added with the known aircraft inertial speed to obtain an aircraft airspeed estimate.

Figure 1:
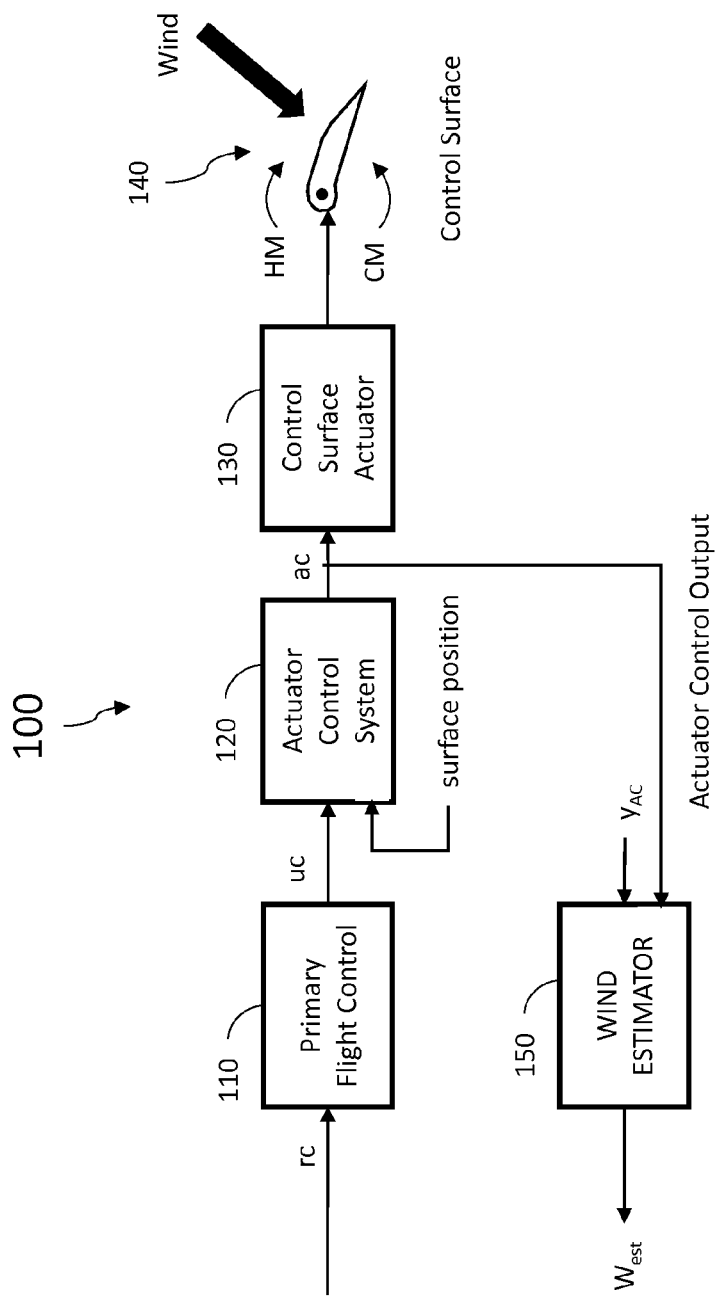
FIG. 1 is a block diagram illustrating a wind speed estimation system of one embodiment of the present invention.

FIG. 1 is a block diagram illustrating a wind speed estimation system 100 of one embodiment of the present disclosure. System 100 includes a primary flight control 110, which comprises an on-board avionics system that generates control commands to aircraft components that influence the aircraft's movements and flight. Control of such aircraft components includes, but are not necessarily limited to, control of the thrust produced by the aircraft's engines and of the aircraft's various flight control surfaces (for example, rudders, elevators, ailerons) to adjust its speed and the attitude. These control commands may be generated, for example, in response to pilot inputs or from an auto-pilot. The response of the primary flight control 110 to these inputs may also be in part determined based on the current flight control mode and/or flight stage of the aircraft. For example, the current flight control mode may indicate whether the aircraft is operating in ground mode, flight mode, or flare mode, if the aircraft is in level flight or turning, and the like. Depending on the flight control mode, the primary flight control 110 may interpret (i.e., respond to) pilot actions differently, or otherwise limit what pilot actions can be performed in the different modes.

In the particular illustration of FIG. 1, wind speed estimation system 100 utilizes parameters associated with control by the primary flight control 110 of a flight control surface 140. As shown in FIG. 1, primary flight control 110 issues control commands (shown as "uc") to actuator control system 120. For at least one implementation, control surface 140 is electronically controlled and hydraulically activated. However, in other implementations, different actuation technologies may be utilized. Actuator control commands, uc, are transmitted by primary flight control 110 to actuator control system 120, which converts those commands into control signals. Those control signals serve as an actuator control output (shown as "ac") that mechanically controls the state of the aircraft. More specifically, actuator control system 120 sends this actuator control output ac to the control surface actuator 130 that drives control surface 140 into the position dictated by the primary flight control 110.

Wind speed estimation system 100 uses the actuator control output, and other measurements from the aircraft (shown by $y_{AC}$) as inputs into the wind estimator 150. In one embodiment, $y_{AC}$ includes a pilot or autopilot command (rc), control surface and throttle commands (uc), measured/estimated aircraft states (e.g., angular rates, Euler angles, North-East-Down position and velocities), aircraft linear accelerations along the body x, y, and z axes, the pitot tube based airspeed estimate, and the actuator control output (shown as ac in FIG. 1). Based on the actuator control output, and the measured aircraft signals (as captured by $y_{AC}$), wind estimator 150 calculates a wind speed estimate (shown as "$W_{est}$") by applying this information to an onboard aircraft model as described below.

Figure 2:
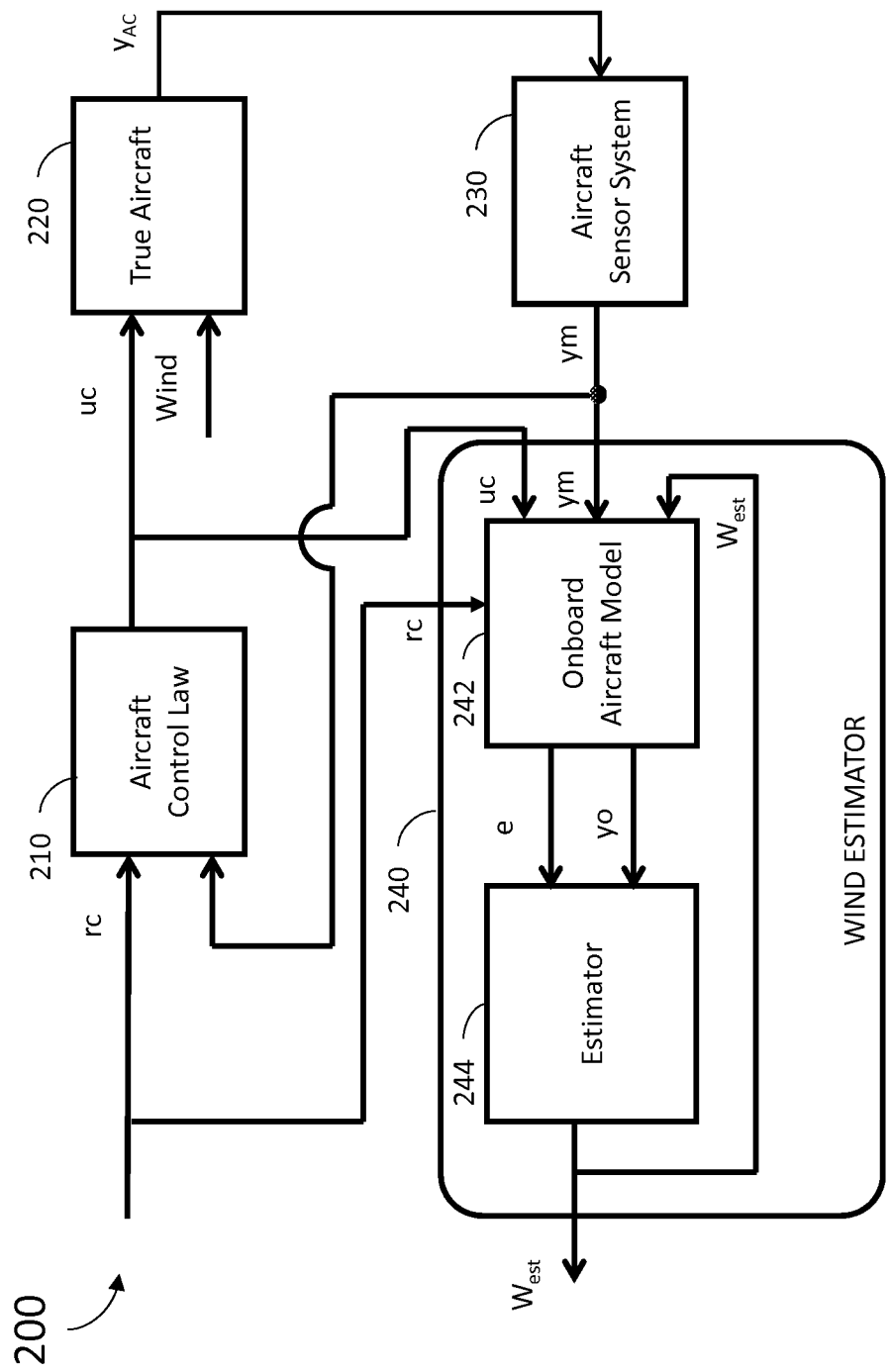
FIG. 2 is another block diagram illustrating a wind speed estimation system of one embodiment of the present invention.

FIG. 2 illustrates generally at 200 a more specific implementation of wind speed estimation system 100. Based on the pilot or autopilot reference command rc, an aircraft control law 210 provides actuator control output uc, to the aircraft (which is represented in FIG. 2 as True Aircraft 220) to control deflection of control surface 140. In FIG. 2, $y_{AC}$ represents the response of the true aircraft 220 discussed above. Accordingly, the aircraft sensors 230 include those on-board devices whose function is to measure each of those physical parameters generate measured output signals ym. The information conveyed by ym therefore includes measurements that capture the response of the true aircraft 220 to the actuator control output uc. As shown in FIG. 2, the actuator control output uc and the measured output signals ym are both provided as inputs to the wind estimator 240.

Wind estimator 240 includes an onboard aircraft model 242 that receives and input ym and uc. Onboard aircraft model 242 includes a mathematical model that replicates the true aircraft 220 and can estimate how true aircraft 220 responds to various inputs. Therefore, given the actuator control output uc, the onboard aircraft model 242 can calculate an expected output state y of the aircraft, which it outputs as yo. That is, based on the mathematical model that replicates the true aircraft 220 residing in the onboard aircraft model 242, the onboard aircraft model 242 can estimate an expected resulting state yo that true aircraft 220 should possess if the actuator control output uc is provided as an input into the true aircraft 220.

Any deviation between the expected output state yo and the measured state ym of the true aircraft 220 is represented within wind estimator 240 by an error vector, e. If the input uc into the true aircraft 220 results in the aircraft achieving a measured output state ym that matches the expected output state yo calculated by the onboard aircraft model 242, then the error e will be zero. Any difference between yo and ym (i.e., a non-zero error e) may indicate the existence of a wind load on the control surface 140 which the onboard aircraft model 242 is not completely accounting for. Estimator 244 then takes the expected output yo and the error vector e and estimates what wind speed, $W_{est}$, would produce that error. That estimated wind speed, $W_{est}$, is then provided to the onboard aircraft model 242 to determine what the expected output yo of the true aircraft 220 would be given the actuator control output uc and taking into account the effects of wind loading on control surface 140. Estimator 244 continues updating its wind speed estimate, $W_{est}$, using it as feedback to onboard aircraft model 242 to drive the error e to zero. As the error e converges on a minimal acceptable error (ideally zero), $W_{est}$ becomes an increasingly accurate estimate of the wind speed affecting operation of control surface 140, and consequently of the wind speed in the vicinity of the aircraft.

Figure 3:
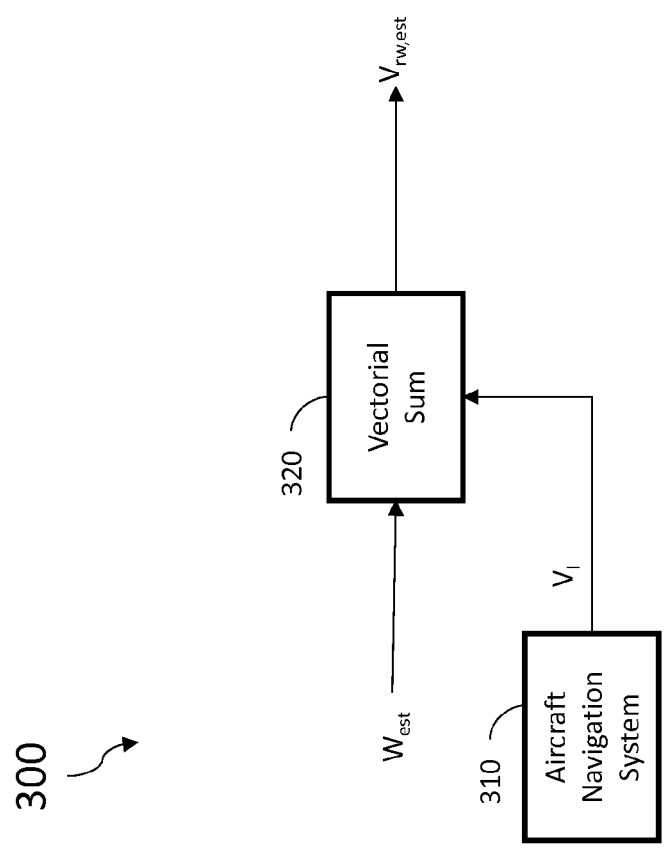
FIG. 3 is a block diagram illustrating calculation of an aircraft airspeed estimate from a wind speed estimation for one embodiment of the present invention.

With an accurate wind speed estimate $W_{est}$ obtained, the airspeed of the aircraft may be derived as illustrated generally at 300 in FIG. 3. More specifically, an aircraft inertial velocity, $V_I$, may be obtained using aircraft navigation system 310 (which may include for example, GNSS sensors, inertial sensors, and a Kalman filter). The aircraft inertial velocity, $V_I$, is vectorially summed with $W_{est}$ (as shown at 320) to arrive at an estimate of the aircraft's airspeed, $V_{rw,est}$. This airspeed estimate may then be used by various aircraft systems in lieu of airspeed data obtained from a pitot tube.

Figure 4:
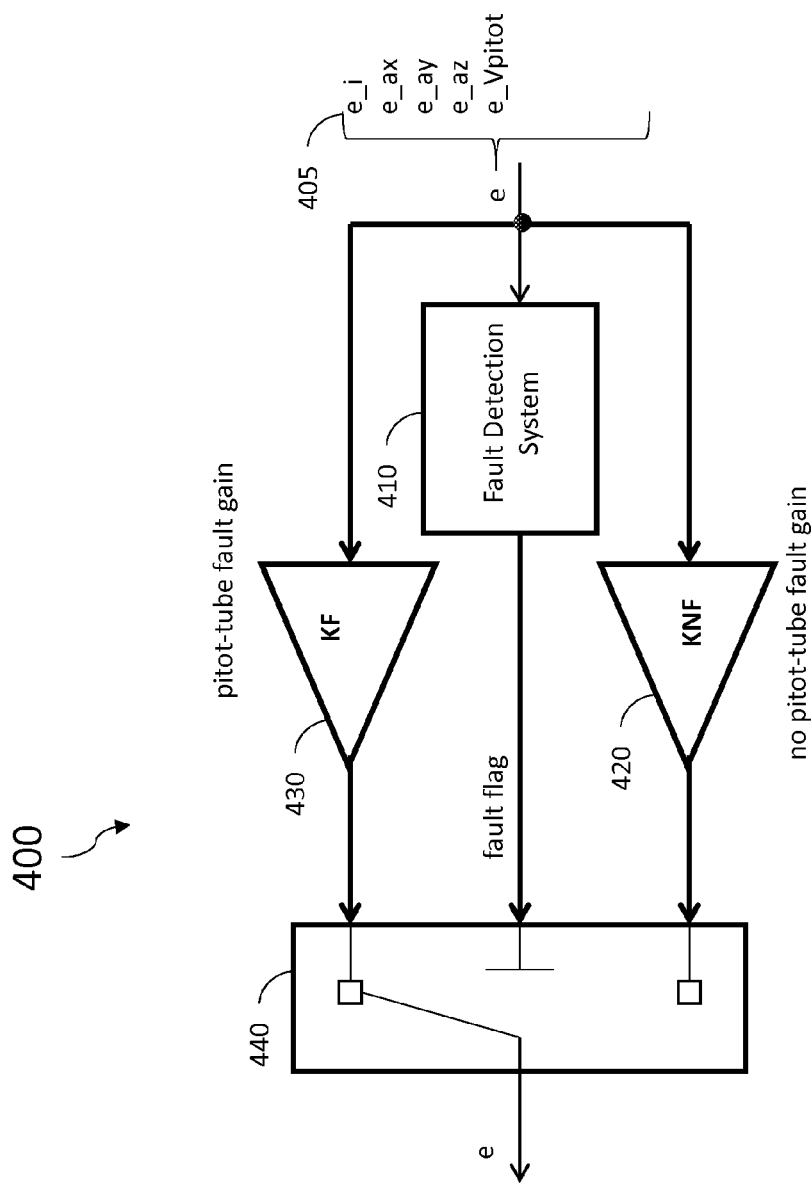
FIG. 4 is a block diagram illustrating gain selection logic utilized by a wind speed estimation system of one embodiment of the present invention.

In one embodiment, wind speed estimator 240 includes selection logic 400 as illustrated in FIG. 4. As shown at 405, the error vector e produced by onboard aircraft model 242 includes state error estimates for various response parameters of the aircraft such as for activator control input (shown as e_i), linear accelerations along the x, y and z axes of the aircraft (shown as e_ax, e_ay, e_az) as well as for airspeed measurements from the pitot tube (e_Vpitot).

In one embodiment, when the pitot tube is operating correctly, selection logic 400 applies a first gain 420 (indicated by K no-fault, or KNF) to the error vector e which is supplied to estimator 244. This is so that the pitot tube measurement may be given a greater weight in calculating the wind speed estimate. Conversely, when the pitot tube is not operating correctly, selection logic 400 applies a second gain 430 (indicated by K fault, or KF) so that so that pitot tube based measurements are given little to no weight. As shown in FIG. 4, a logic switch 440 is configured to switch between KNF 420 and KF 430 based on the status of a fault flag generated by a fault detection system 410. In operation, when the pitot tube is operating correctly, errors captured by the error vector e should be minimal (they may be potentially affected to a minor degree do inaccuracies introduced by sensors 230 in generating measurements ym), such that the resulting residual observed by fault detection system 410 is low. In this condition, the fault flag is reset and logic switch 440 is switched so that the no-fault gain KNF 420 is selected. If the residual exceeds a threshold, residue trigger 410 sets the fault_flag and logic switch 440 is switched so that the KF gain 430 is selected.

Figure 5:
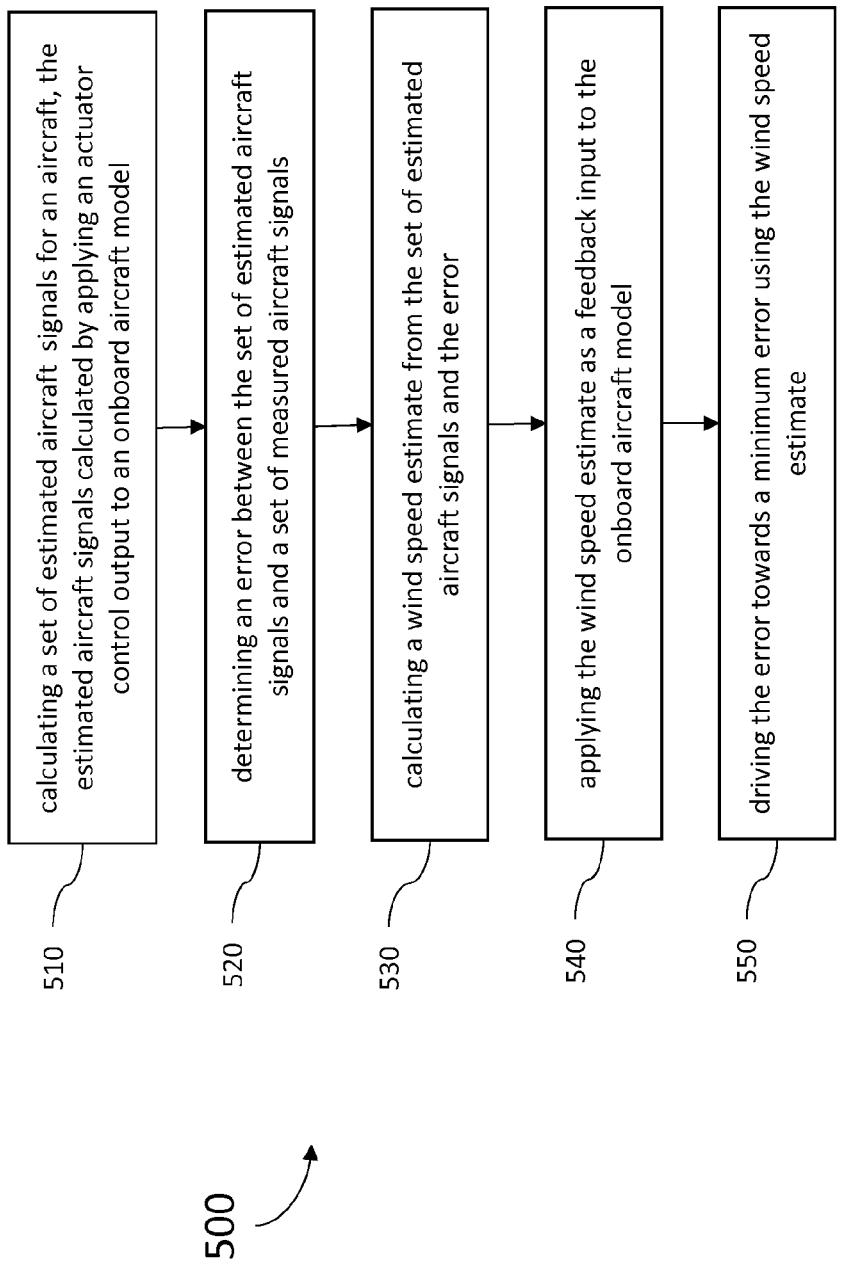
FIG. 5 is a flow chart illustrating a method for wind speed estimation of one embodiment of the present invention.

FIG. 5 is a flow chart illustrating a method 500 of one embodiment of the present disclosure for obtaining wind speed estimates. In one embodiment, method 500 is performed in conjunction with a wind estimator such 150 or 240 described above with respect to any of the embodiments above pertaining to FIGS. 1-4. Method 500 begins at 510 with calculating a set of estimated aircraft signals for an aircraft, the estimated aircraft signals calculated by applying an actuator control output to an onboard aircraft model. As with the embodiments discussed above, method 500 utilizes parameters associated with the operation of a flight control surface by the aircraft's primary flight control. The attitude, position, accelerations and other physical parameters that describe the state of the aircraft after responding to the actuator control output are manifested as outputs. The aircraft includes sensors (such as sensors 230 described above) whose function is to measure each of those physical parameters generate a set of measured signals. The information conveyed by the set of measured signals therefore includes measurements that capture the response of the aircraft to the actuator control output. This set of measure states along with the actuator control output may be used by the onboard aircraft model to predict the set of expected output states for the aircraft.

The method proceeds to 520 with determining an error between the set of estimated aircraft signals and a set of measured aircraft signals. The measured aircraft signals may be obtained using the sensors onboard the aircraft discussed above. Any deviation between the set of expected output signals the set of measured aircraft signals may be represented by an error vector e. When inputs into the aircraft result in the aircraft achieving a measured output that matches the expected output calculated by the onboard aircraft model, then the error e will be zero. Differences between the estimated and measured outputs indicate the existence of a wind load on the control surface which the onboard aircraft model has is not completely accounted for.

The method proceed to 530 with calculating a wind speed estimate (i.e., $W_{est}$) from the set of estimated aircraft signals and the error. That estimated wind speed, $W_{est}$, is then provided as an input into the onboard aircraft model to determine what the expected output state of the aircraft would be given the actuator control output and also taking into account the effects of wind loading on the control surface actuated by that actuator control output. The method proceeds to 540 with applying the wind speed estimate as a feedback input to the onboard aircraft model and to 550 with driving the error towards a minimum error using the wind speed estimate. In other words, the wind speed estimate is used it as feedback to the onboard aircraft model, and varied to drive the error, e, calculated by the onboard aircraft model towards a minimum error. Ideally that minimum error would be zero, but in some implementations, a steady-state error may still remain due to sensor tolerances or other inaccuracies. As the error converges on that minimal acceptable error, $W_{est}$ becomes an increasingly accurate estimate of the wind speed affecting operation of the control surface, and consequently of the wind speed being experienced by the aircraft. With an accurate wind speed estimate, $W_{est}$, obtained, the method may optionally continue to derive the airspeed of the aircraft, such as already illustrated in FIG. 3. An aircraft inertial velocity, $V_I$, may be obtained using aircraft navigation sensors. $V_I$, can then be vectorially summed with the wind speed estimate, $W_{est}$, to arrive at an estimate of the aircraft's airspeed, $V_{rw,est}$. This airspeed estimate may then be used by various aircraft systems in lieu of airspeed data obtained from a pitot tube.

EXAMPLE EMBODIMENTS

Example 1 includes an on-board avionics airspeed estimation system, the system comprising: a flight control surface for an aircraft; a control surface actuator coupled to the flight control surface, wherein the control surface actuator receives an actuator control output signal from an actuator control system and drives the flight control surface into a position based on the actuator control output signal; a wind estimator coupled to a plurality of aircraft sensors, wherein the plurality of aircraft sensors output a set of aircraft measurements to the wind estimator and wherein the actuator control output signal is further provided to the wind estimator; wherein the wind estimator calculates a wind speed estimate by applying the actuator control output and the set of aircraft measurements to an onboard aircraft model.

Example 2 includes the system of example 1, further comprising a primary flight control system, wherein the actuator control system transmits the actuator control output to the control surface actuator, and wherein the actuator control output drives the flight control surface into a position dictated by the primary flight control system.

Example 3 includes the system of any of examples 1-2, wherein the actuator control output represents either a hydraulic pressure signal or an electric servo current.

Example 4 includes the system of any of examples 1-3, wherein the flight control surface comprises one of either a rudder, an elevator, or an aileron.

Example 5 includes the system of any of examples 1-4, wherein the set of aircraft measurements comprise one or both of aircraft inertial measurements and attitude measurements.

Example 6 includes the system of any of examples 1-5, wherein the set of aircraft measurements include x-axis, y-axis and z-axis acceleration measurements.

Example 7 includes the system of any of examples 1-6, wherein the wind estimator further comprises: the onboard aircraft model; and an estimator coupled to the onboard aircraft model, wherein the onboard aircraft model outputs to the estimator a set of estimated aircraft signals and an error vector from a deviation between the set of estimated aircraft signals and the set of aircraft measurements from which the estimator generates the wind speed estimate; and wherein the estimator provides the wind speed estimate as a feedback input into the onboard aircraft model, adjusting the wind speed estimate to drive the error vector towards a minimum acceptable error.

Example 8 includes the system of any example 7, wherein the estimator varies the wind speed estimate to drive the error vector toward zero.

Example 9 includes the system of any of examples 7-8, wherein the wind estimator further includes selection logic that applies a selected set of weighted gains to the error vector based on a residual of the error vector.

Example 10 includes the system of any of examples 7-9, wherein the onboard aircraft model comprises a mathematical model that estimates an expected output of the aircraft based on inputs applied to mathematical model.

Example 11 includes the system of any of examples 1-10, wherein the on-board avionics airspeed estimation system further outputs an aircraft airspeed estimate by vectorially summing the wind speed estimate with an aircraft inertial velocity.

Example 12 includes a method for obtaining airspeed estimates, the method comprising: calculating a set of estimated aircraft signals for an aircraft, the estimated aircraft signals calculated by applying an actuator control output to an onboard aircraft model; determining an error between the set of estimated aircraft signals and a set of measured aircraft signals; calculating a wind speed estimate from the set of estimated aircraft signals and the error; applying the wind speed estimate as a feedback input to the onboard aircraft model; and driving the error towards a minimum error using the wind speed estimate.

Example 13 includes the method of example 12, wherein a control surface actuator receives the actuator control output signal from an actuator control system and drives a flight control surface into a position based on the actuator control output signal; and wherein the set of measured aircraft signals capture a response of the aircraft to the actuator control output.

Example 14 includes the method of any of examples 12-13, wherein the actuator control output represents either a hydraulic pressure signal or an electric servo current.

Example 15 includes the method of any of examples 12-14, wherein the flight control surface comprises one of either a rudder, an elevator, or an aileron.

Example 16 includes the method of any of examples 12-15, wherein the set of measured aircraft signals comprise one or both of aircraft inertial measurements and attitude measurements.

Example 17 includes the method of any of examples 12-16, wherein the onboard aircraft model calculates the set of estimated aircraft signals and the error from a difference between the set of estimated aircraft signals and the set of measured aircraft signals.

Example 18 includes the method of any of examples 12-17, wherein driving the error towards a minimum error using the wind speed estimate further comprises varying the wind speed estimate to drive the error vector toward zero.

Example 19 includes the method of any of examples 12-18, further comprising calculating an aircraft airspeed estimate from the wind speed estimate.

Example 20 includes the method of example 19, further comprising vectorially summing the wind speed estimate with an aircraft inertial velocity to calculate the aircraft airspeed estimate.

In various alternative embodiments, any of the system elements or processes described throughout this disclosure may be implemented on one or more on-board avionics computer systems comprising a processor executing code to realize those elements, said code stored on an on-board non-transient data storage device. Therefore other embodiments of the present disclosure include program instructions resident on computer readable media which when implemented by such on-board avionics computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An on-board avionics airspeed estimation system, the system comprising:
   a flight control surface for an aircraft;
   a control surface actuator coupled to the flight control surface, wherein the control surface actuator receives an actuator control output signal from an actuator control system and drives the flight control surface into a position based on the actuator control output signal; and
   a wind estimator coupled to a plurality of aircraft sensors, wherein the plurality of aircraft sensors output a set of aircraft measurements to the wind estimator and wherein the actuator control output signal is further provided to the wind estimator;
   wherein the wind estimator calculates a wind speed estimate by applying the actuator control output and the set of aircraft measurements to an onboard aircraft model.

2. The system of claim 1, further comprising a primary flight control system, wherein the actuator control system transmits the actuator control output to the control surface actuator, and wherein the actuator control output drives the flight control surface into a position dictated by the primary flight control system.

3. The system of claim 1, wherein the actuator control output represents either a hydraulic pressure signal or an electric servo current.

4. The system of claim 1, wherein the flight control surface comprises one of either a rudder, an elevator, or an aileron.

5. The system of claim 1, wherein the set of aircraft measurements comprise one or both of aircraft inertial measurements and attitude measurements.

6. The system of claim 1, wherein the set of aircraft measurements include x-axis, y-axis and z-axis acceleration measurements.

7. The system of claim 1, wherein the wind estimator further comprises:
   the onboard aircraft model; and
   an estimator coupled to the onboard aircraft model, wherein the onboard aircraft model outputs to the estimator a set of estimated aircraft signals and an error vector from a deviation between the set of estimated aircraft signals and the set of aircraft measurements from which the estimator generates the wind speed estimate; and
   wherein the estimator provides the wind speed estimate as a feedback input into the onboard aircraft model, adjusting the wind speed estimate to drive the error vector towards a minimum acceptable error.

8. The system of claim 7, wherein the estimator varies the wind speed estimate to drive the error vector toward zero.

9. The system of claim 7, wherein the wind estimator further includes selection logic that applies a selected set of weighted gains to the error vector based on a residual of the error vector.

10. The system of claim 7, wherein the onboard aircraft model comprises a mathematical model that estimates an expected output of the aircraft based on inputs applied to mathematical model.

11. The system of claim 1, wherein the on-board avionics airspeed estimation system further outputs an aircraft airspeed estimate by vectorially summing the wind speed estimate with an aircraft inertial velocity.

12. A method for obtaining airspeed estimates, the method comprising:
   calculating a set of estimated aircraft signals for an aircraft, the estimated aircraft signals calculated by applying an actuator control output to an onboard aircraft model;
   determining an error between the set of estimated aircraft signals and a set of measured aircraft signals;
   calculating a wind speed estimate from the set of estimated aircraft signals and the error;
   applying the wind speed estimate as a feedback input to the onboard aircraft model; and driving the error towards a minimum error using the wind speed estimate.

13. The method of claim 12, wherein a control surface actuator receives the actuator control output signal from an actuator control system and drives a flight control surface into a position based on the actuator control output signal; and wherein the set of measured aircraft signals capture a response of the aircraft to the actuator control output.

14. The method of claim 13, wherein the actuator control output represents either a hydraulic pressure signal or an electric servo current.

15. The method of claim 13, wherein the flight control surface comprises one of either a rudder, an elevator, or an aileron.

16. The method of claim 12, wherein the set of measured aircraft signals comprise one or both of aircraft inertial measurements and attitude measurements.

17. The method of claim 12, wherein the onboard aircraft model calculates the set of estimated aircraft signals and the error from a difference between the set of estimated aircraft signals and the set of measured aircraft signals.

18. The method of claim 12, wherein driving the error towards a minimum error using the wind speed estimate further comprises varying the wind speed estimate to drive the error vector toward zero.

19. The method of claim 12, further comprising calculating an aircraft airspeed estimate from the wind speed estimate.

20. The method of claim 19, further comprising vectorially summing the wind speed estimate with an aircraft inertial velocity to calculate the aircraft airspeed estimate.

\* \* \* \* \*